United States Patent
Vernon et al.

(10) Patent No.: US 8,951,160 B2
(45) Date of Patent: Feb. 10, 2015

(54) MULTI-SPEED AUTOMATIC TRANSMISSION

(71) Applicant: Toyota Motor Engineering & Manufacturing North America, Inc., Erlanger, KY (US)

(72) Inventors: Nicholas Steven Vernon, Brighton, MI (US); Brian Carl Schneidewind, Ann Arbor, MI (US); Sam David Koch, Ann Arbor, MI (US); Venkat R. Deshpande, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/912,254

(22) Filed: Jun. 7, 2013

(65) Prior Publication Data
US 2014/0364270 A1  Dec. 11, 2014

(51) Int. Cl.
*F16H 3/62*  (2006.01)

(52) U.S. Cl.
CPC .................................... *F16H 3/62* (2013.01)
USPC ....................................................... 475/276

(58) Field of Classification Search
CPC ............... F16H 2200/0065; F16H 2200/2012; F16H 2200/2046; F16H 2200/2064; F16H 1/46; F16H 3/66
USPC .................. 475/275, 276, 280, 903
See application file for complete search history.

(56) References Cited

U.S. PATENT DOCUMENTS

| | | | |
|---|---|---|---|
| 6,176,803 B1 | 1/2001 | Meyer et al. | |
| 7,226,381 B2 | 6/2007 | Klemen | |
| 7,946,948 B2 | 5/2011 | Phillips et al. | |
| 8,079,932 B2 | 12/2011 | Phillips et al. | |
| 8,088,032 B2 | 1/2012 | Gumpoltsberger et al. | |
| 2007/0275814 A1* | 11/2007 | Bucknor et al. | 475/275 |
| 2010/0331138 A1 | 12/2010 | Phillips | |
| 2011/0009229 A1 | 1/2011 | Bauknecht et al. | |
| 2011/0015021 A1* | 1/2011 | Maguire et al. | 475/8 |
| 2011/0124462 A1 | 5/2011 | Meyer et al. | |

(Continued)

FOREIGN PATENT DOCUMENTS

| | | | | |
|---|---|---|---|---|
| DE | 4114462 A1 * | 11/1991 | | F16H 47/08 |
| JP | 2011-513662 A | 4/2011 | | |

(Continued)

OTHER PUBLICATIONS

U.S. Appl. No. 13/737,558, filed Jan. 9, 2013, Vernon, et al.

(Continued)

*Primary Examiner* — Justin Holmes
(74) *Attorney, Agent, or Firm* — Oblon, Spivak, McClelland, Maier & Neustadt, L.L.P.

(57) ABSTRACT

An multi-speed automatic transmission providing at least nine forward speeds and one reverse speed, includes four planetary gear sets, six shift control elements, an input shaft, an output shaft, and a transmission case. Each planetary gear set includes a sun gear, a pinion gear set, a carrier that rotatably supports the pinion gear set, and a ring gear. A carrier of a first planetary gear set is connected to the ring gear of a second planetary gear set and a carrier of the second planetary gear set is connected to the ring gear of the first planetary gear set. The first and second planetary gear sets are concentrically arranged in a common plane.

12 Claims, 7 Drawing Sheets

(56) References Cited

U.S. PATENT DOCUMENTS

| | | |
|---|---|---|
| 2011/0306460 A1 | 12/2011 | Haupt et al. |
| 2012/0010038 A1 | 1/2012 | Hart et al. |
| 2012/0108382 A1 | 5/2012 | Saitoh et al. |
| 2012/0302393 A1* | 11/2012 | Seo et al. .................. 475/276 |
| 2012/0302394 A1* | 11/2012 | Seo et al. .................. 475/276 |
| 2012/0329600 A1 | 12/2012 | Park et al. |
| 2013/0150204 A1 | 6/2013 | Park et al. |
| 2013/0244823 A1 | 9/2013 | Hzuka et al. |

FOREIGN PATENT DOCUMENTS

| | | |
|---|---|---|
| JP | 2012-097825 A | 5/2012 |
| JP | 2013-007481 A | 1/2013 |
| JP | 2013-119948 A | 6/2013 |
| JP | 2013-194826 A | 9/2013 |

OTHER PUBLICATIONS

U.S. Appl. No. 13/737,629, filed Jan. 9, 2013, Vernon, et al.

\* cited by examiner

Gear Tooth Count

|        | P1    | P2    | P3    | P4    |
|--------|-------|-------|-------|-------|
| Rho    | 0.444 | 0.674 | 0.351 | 0.600 |
| Sun    | 28    | 68    | 26    | 48    |
| Ring   | 63    | 101   | 74    | 80    |
| Pinion | 18    | 16    | 24    | 16    |

Fig. 3

| | C1 | C2 | C3 | B1 | B2 | B3 | Ratio | Step |
|---|---|---|---|---|---|---|---|---|
| 1 | | O | | | O | O | 4.809 | 1.705 |
| 2 | O | O | | O | | O | 2.821 | 1.456 |
| 3 | O | O | | | | O | 1.937 | 1.433 |
| 4 | | O | O | | | O | 1.351 | 1.351 |
| 5 | | O | O | O | | | 1.000 | 1.188 |
| 6 | | O | O | O | | | 0.842 | 1.143 |
| 7 | | | O | | O | | 0.736 | 1.178 |
| 8 | O | | O | | O | | 0.625 | 1.167 |
| 9 | O | | | | O | | 0.536 | |
| R | | | | | O | O | -4.358 | Total 8.977 |

MULTI-SPEED AUTOMATIC TRANSMISSION

BACKGROUND OF THE INVENTION

1. Field of the Invention

The present invention relates generally to an automatic transmission for transmitting torque from a prime mover to a drive train of a vehicle with a plurality of speed ratios.

2. Description of the Related Art

Automatic transmissions with an increased number of gear ratios have been proposed. In a vehicle with such an automatic transmission, a frequent up-shift or down-shift is performed to provide improved fuel efficiency and drivability. On the other hand, there is also a need for a lighter and more compact automatic transmission design by which auto manufactures can optimize the drive train layout that makes it possible to lower manufacturing cost and achieve improved fuel efficiency.

However, automatic transmissions with an increased number of gear ratios, for example, 6 or more speeds, tend to have a more complex design with an increased number of components that lead to an increase in volume and weight of the transmission which unfavorably affects manufacturing cost and fuel efficiency of the vehicle. Furthermore, problems of packaging components within a transmission which hinder assembly of the transmission into a vehicle have arisen.

SUMMARY OF THE INVENTION

It would thus be particularly advantageous to reduce packaging difficulties in a multi-speed automatic transmission while enhancing a vehicle's fuel efficiency and drivability.

The present invention provides a multi-speed automatic transmission including a structure with a reduced packaging size. The automatic transmission improves fuel efficiency of the vehicle by providing a wide gear ratio spread and close ratio steps between adjacent gear ratios, and by implementing a frequent up-shift or down-shift while keeping an engine running within an efficient speed range. In addition, the automatic transmission enhances drivability or performance of the vehicle by quickly responding to a torque demand for various operating conditions utilizing the close gear ratio steps.

In an aspect of the disclosure, a multi-speed automatic transmission includes a first planetary gear set including a first sun gear, a first pinion gear set, a first carrier that rotatably supports the first pinion gear set, and a first ring gear, in which the first sun gear meshes with the first pinion gear set, and the first pinion gear set meshes with the first sun gear and the first ring gear. The transmission includes a second planetary gear set including a second sun gear, a second pinion gear set, a second carrier that rotatably supports the second pinion gear set, and a second ring gear, in which the second sun gear meshes with the second pinion gear set, and the second pinion gear set meshes with the second sun gear and the second ring gear. The first carrier is connected to the second ring gear, and the second carrier is connected to the first ring gear. The first and second planetary gear sets may be concentrically arranged in a common plane.

The automatic transmission further includes a third planetary gear set including a third sun gear, a third pinion gear set, a third carrier that rotatably supports the third pinion gear set, and a third ring gear, in which the third sun gear meshes with the third pinion gear set, and the third pinion gear set meshes with the third sun gear and the third ring gear. The transmission includes a fourth planetary gear set including a fourth sun gear, a fourth pinion gear set, a fourth carrier that rotatably supports the fourth pinion gear set, and a fourth ring gear, in which the fourth sun gear meshes with the fourth pinion gear set, and the fourth pinion gear set meshes with the fourth sun gear and the fourth ring gear. The third carrier is connected to the fourth ring gear, the fourth carrier is connected to the third ring gear, and the fourth sun gear is connected to the second carrier.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views. Further, as used herein, the words "a," "an" and the like generally carry a meaning of "one or more," unless stated otherwise.

Figure 1:
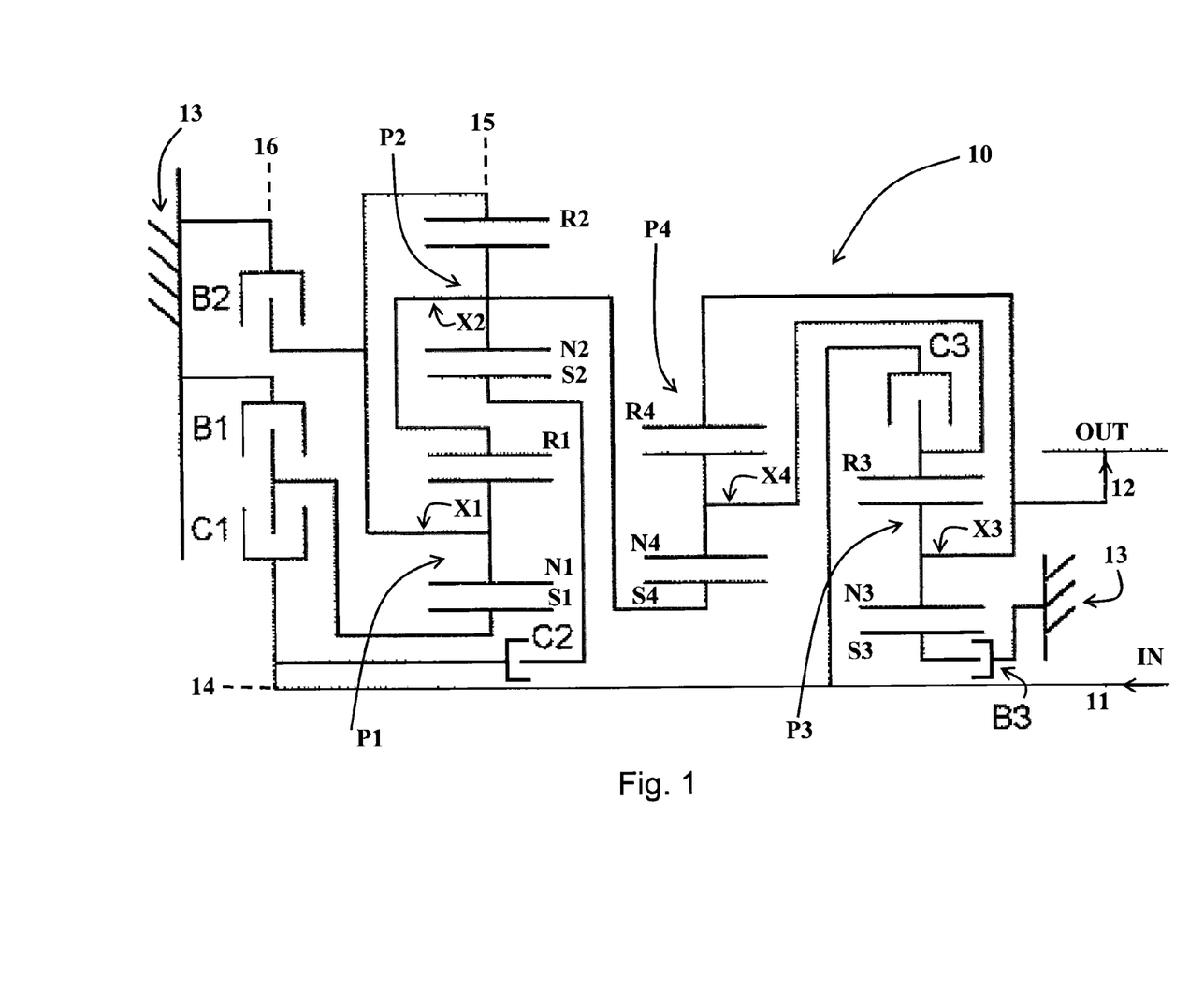
FIG. 1 is a schematic view of an illustrative automatic transmission in accordance with an exemplary aspect of the disclosure.

FIG. 1 illustrates a schematic view of a multi-speed automatic transmission 10 in accordance with an exemplary aspect of the present disclosure. The automatic transmission 10 includes an input shaft 11 which receives torque from a torque converter driven by a prime mover, for example, an internal combustion engine. The torque transmitted to the automatic transmission 10 via the input shaft 11 is multiplied by a gear ratio and delivered to an output shaft 12. The automatic transmission 10 also includes four planetary gear sets P1 to P4, each including a corresponding carrier X1 to X4, and a plurality of shift control elements disposed inside a transmission case 13. The shift control elements include first, second, and third brakes B1, B2, and B3, as well as first, second, and third clutches C1, C2, and C3. The four planetary gear sets P1 to P4 are rotatably supported and concentrically arranged along a rotational axis 14.

The first planetary gear set P1 includes a first sun gear S1 rotatably supported along the rotational axis 14, a first pinion gear set N1, a first carrier X1 that rotatably supports the first pinion gear set N1, and a first ring gear R1. The first sun gear S1 meshes with the first pinion gear set N1, and the first pinion gear set N1 meshes with the first sun gear S1 and the first ring gear R1.

The second planetary gear set P2 includes a second sun gear S2 rotatably supported along the rotational axis 14, a second pinion gear set N2, a second carrier X2 that rotatably supports the second pinion gear set N2, and a second ring gear R2. The second sun gear S2 meshes with the second pinion gear set N2, and the second pinion gear set N2 meshes with the second sun gear S2 and the second ring gear R2. The second ring gear R2 is connected to the first pinion gear set N1 through the first carrier X1 and the first ring gear R1 is connected to the second pinion gear set N2 through the second carrier X2. The first carrier X1 is connected to the second ring gear R2 in a CR connection (a carrier-ring connection) and the second carrier X2 is connected to the first ring gear R1 in a CR connection, which forms a first CR-CR connection between the first planetary gear set P1 and the second planetary gear set P2, as shown in FIG. 1.

The first and second planetary gear sets P1, P2 may be radially stacked, with the second planetary gear set P2 being radially outward of the first planetary gear set P1 so that the two planetary gear sets P1, P2 are arranged in a common gear plane 15, with the plane 15 intersecting all of the gears of the planetary gear sets P1, P2 perpendicularly to the axis of rotation of the gears of the planetary gears sets P1, P2, thus providing a considerable axial space savings.

Figure 2:
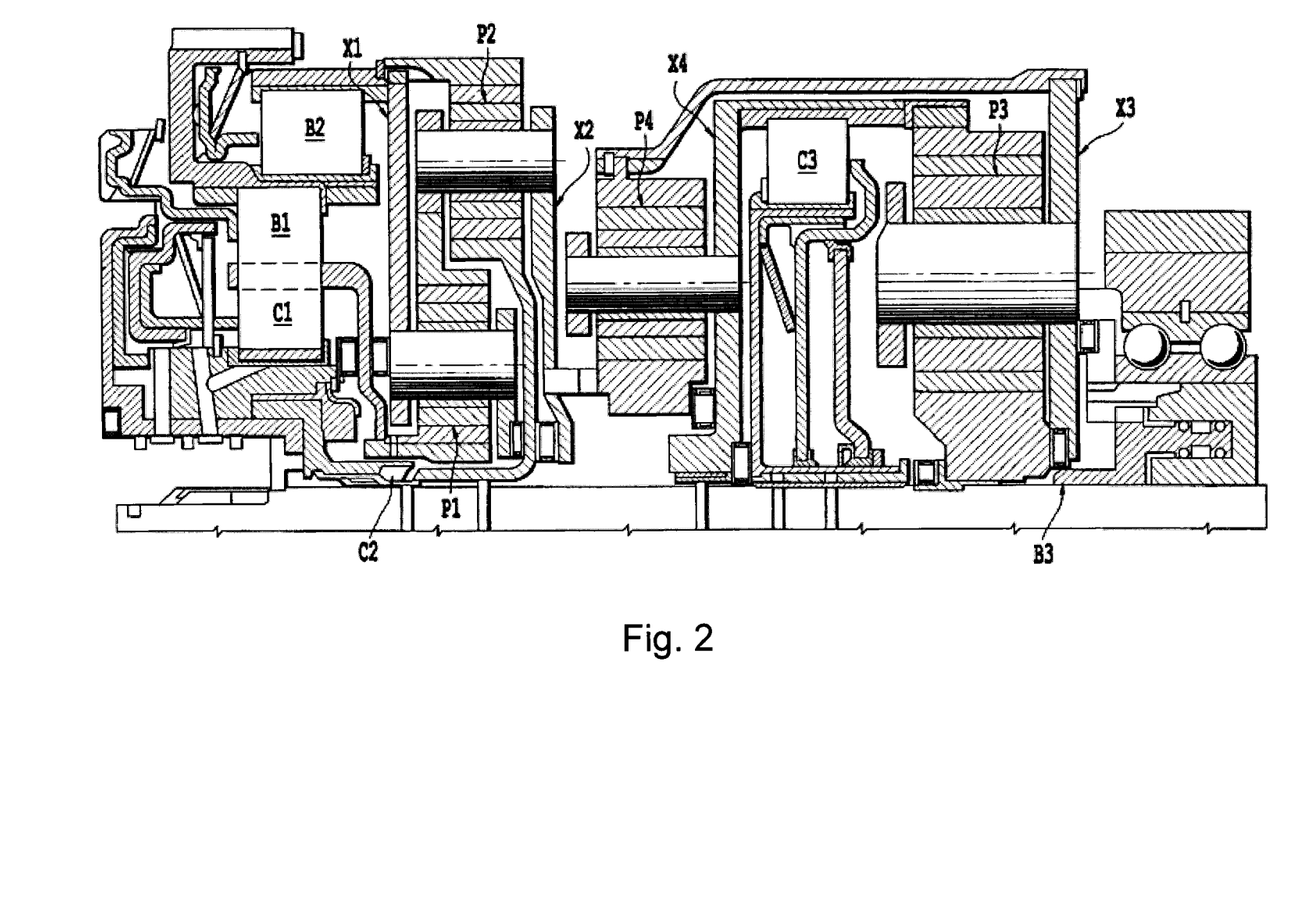
FIG. 2 is a cross-sectional view of the illustrative transmission showing CR-CR connections of two pairs of planetary gear sets of the illustrative transmission in accordance with an exemplary aspect of the disclosure.

FIG. 2 shows a cross-sectional view of the automatic transmission 10. The first CR-CR connection between the first planetary gear set P1 and the second planetary gear set P2 arranged in the common gear plane 15 is illustrated on the left side of the gear train composed of the four planetary gear sets P1 to P4. In particular, the second planetary gear set P2 is arranged radially outward of the first planetary gear set P1 in the common gear plane 15. As a result, an improved packaging of the planetary gear sets is realized, for example, by the axial space savings.

The third planetary gear set P3 includes a third sun gear S3 rotatably supported along the rotational axis 14, a third pinion gear set N3, a third carrier X3 that rotatably supports the third pinion gear set N3, and a third ring gear R3. The third sun gear S3 meshes with the third pinion gear set N3, and the third pinion gear set N3 meshes with the third sun gear S3 and the third ring gear R3.

The fourth planetary gear set P4 includes a fourth sun gear S4 rotatably supported along the rotational axis 14, a fourth pinion gear set N4, a fourth carrier X4 that rotatably supports the fourth pinion gear set N4, and a fourth ring gear R4. The fourth sun gear S4 meshes with the fourth pinion gear set N4, and the fourth pinion gear set N4 meshes with the fourth sun gear S4 and the fourth ring gear R4. The fourth sun gear S4 is connected to the second pinion gear set through the second carrier X2. The fourth ring gear R4 is connected to the third pinion gear set N3 through the third carrier X3 and the third ring gear R3 is connected to the fourth pinion gear set N4 through the fourth carrier X4. The third carrier X3 is connected to the fourth ring gear R4 in a CR connection and the fourth carrier X4 is connected to the third ring gear R3 in a CR connection, which forms a second CR-CR connection between the third planetary gear set P3 and the fourth planetary gear set P4, as shown in FIG. 1. Moreover, both the third planetary gear set P3 and the fourth planetary gear set P4 are axially displaced from each other and arranged concentrically around the rotational axis 14.

As seen in FIG. 1, according to an exemplary aspect of the present disclosure, the second CR-CR connection formed between the third planetary gear set P3 and the fourth planetary gear set P4 is axially positioned to the right side of the first CR-CR connection. The fourth planetary gear set is axially positioned between the first CR-CR connection and the third planetary gear set.

The automatic transmission 10 further includes at least six shift control elements including 3 clutches C1 to C3, and 3 brakes B1 to B3, as shown in FIG. 1. When a clutch is engaged, two elements on both sides of the clutch are connected by the clutch so that rotational power or torque can be transferred from one element to the other element. Meanwhile, when a brake is engaged, an element on one side of the brake is fixedly connected to the transmission case 13 or/and other grounded component by the brake.

In the first planetary gear set P1, the first sun gear S1 is selectively connected to the input shaft 11 by a first clutch C1. The first sun gear S1 is also selectively fixed to the transmission case 13 by a first brake B1. The first carrier X1 is selectively fixed to the transmission case 13 by a second brake B2.

In the second planetary gear set P2, the second sun gear S2 is selectively connected to the input shaft 11 by a second clutch C2.

In the third planetary gear set P3, the third sun gear S3 is selectively fixed to the transmission case 13 or/and other grounded component by a third brake B3. The third ring gear R3 is selectively connected to the input shaft 11 by a third clutch C3. The third carrier X3 is directly connected to the output shaft 12. The term "directly connected" indicates that two members are coupled to each other without any intervening shift control element such as clutch or brake.

According to an exemplary aspect of the present disclosure, at least three shift control elements are engaged among the three clutches C1 to C3, and the three brakes B1 to B3, at any speed of the automatic transmission 10. Typically, shift control elements such as a frictional clutch or a brake, which are not engaged, generate an undesirable drag torque which adversely affects fuel efficiency. However, since at least three shift control elements are engaged in each of nine forward gears and one reverse gear, the drag torque is thus minimized and improved fuel efficiency is achieved.

According to an exemplary aspect of the present disclosure, the automatic transmission 10 provides an improved assembly and a reduced packing size. The automatic transmission 10 provides assembly benefits. In particular, the first and second brakes B1, B2 and the first clutch C1 lie outside of the gear train formed by the planetary gear sets P1 to P4 as shown in FIG. 1, which eases assembly of the gear train. Packaging the clutches and brakes outside of the gear train also makes it easier to supply hydraulic pressure to the clutches and brakes. Moreover, nesting shift control elements, preferably in a single common plane, the plane 16 for example, further provides the automatic transmission 10 with the advantage of a reduced packaging size in an axial length of the transmission. Consequently, the automatic transmission 10 facilitates assembly and integration of the transmission within the vehicle body.

Figure 3:
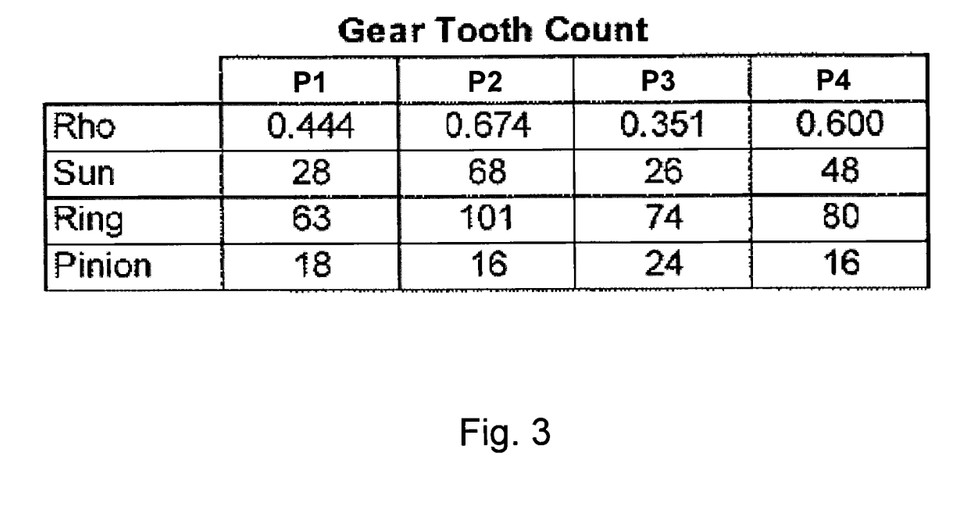
FIG. 3 is a chart showing the number of gear teeth of a sun gear, a ring gear, and a pinion gear in each of four planetary gear sets of the illustrative transmission in accordance with an exemplary aspect of the disclosure.

FIG. 3 is a chart showing the number of gear teeth of a sun gear, a ring gear, and a pinion gear of each of the four planetary gear sets P1 to P4 of the automatic transmission 10 according to an exemplary aspect of the present disclosure. For example, the sun gear S1, the ring gear R1, and the pinion gear N1 of the first planetary gear set P1 have 28, 63, and 18 gear teeth, respectively. "Rho" in FIG. 3 denotes a gear ratio between the sun gear and the ring gear of each planetary gear set. For example, Rho of the first planetary gear set is a gear ratio between the first sun gear and the first ring gear (i.e. the number of gear teeth of the first sun gear S1 divided by the number of gear teeth of the first ring gear R1, 28/63=0.444).

Figure 4:
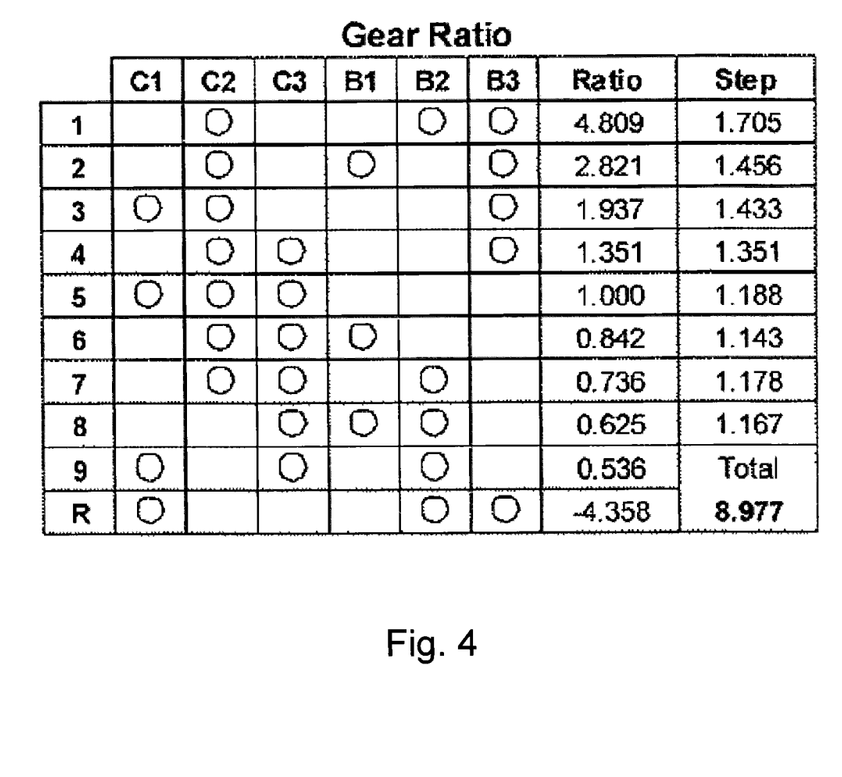
FIG. 4 is a chart showing the engaged shift control elements, gear ratios, and gear ratio steps of each of nine forward gears and one reverse gear of the illustrative transmission in accordance with an exemplary aspect of the disclosure.
Figure 5:
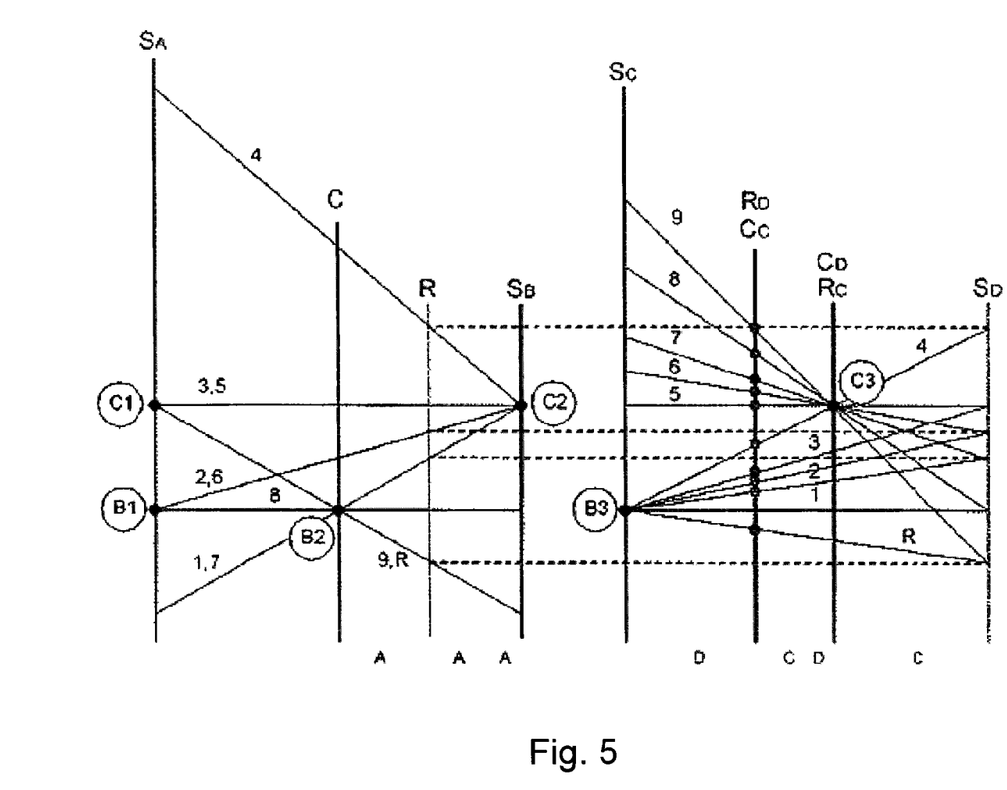
FIG. 5 is a lever diagram showing shifting processes from a first forward speed to a ninth forward speed, as well as a reverse speed, for the illustrative transmission in accordance with an exemplary aspect of the disclosure.
Figure 6:
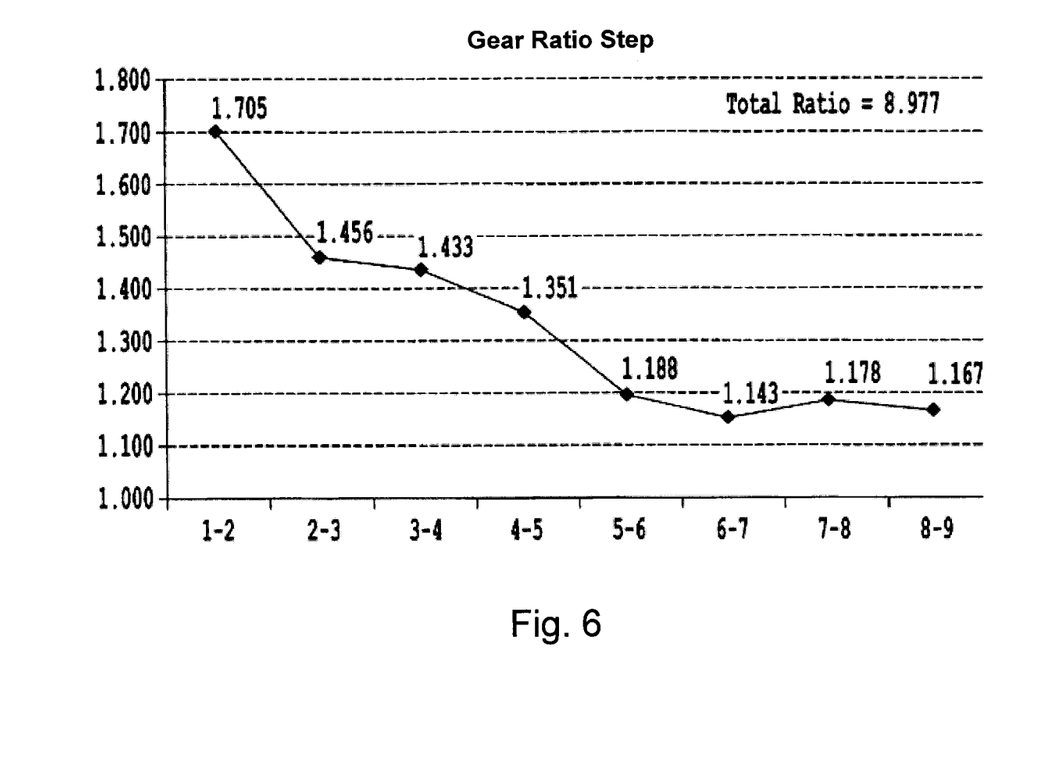
FIG. 6 is a chart showing the gear ratio steps between adjacent forward gears of the illustrative transmission in accordance with an exemplary aspect of the disclosure.

FIG. 4 summarizes the relationships between each gear speed and operating states of the clutches C1 to C3 and the brakes B1 to B3 according to an exemplary aspect of the present disclosure. A circle [O] denotes an "engaged" state while a blank [ ] means a "disengaged" state. FIG. 5 shows shifting processes from a first forward speed to a ninth forward speed, as well as a reverse speed according to an exemplary aspect of the present disclosure. More specifically, as shown in FIGS. 4 and 5, a first forward gear of the automatic transmission 10 is formed when the second clutch C2, the second brake B2, and the third brake B3 are engaged to transmit torque, while the first clutch C1, the third clutch C3, and the first brake B1 are disengaged. A second forward gear is formed when the second clutch C2, the first brake B1, and the third brake B3 are engaged to transmit torque, while the first clutch C1, the third clutch C3, and the second brake B2 are disengaged. A third forward gear is formed when the first clutch C1, the second clutch C2, and the third brake B3 are engaged to transmit torque, while the third clutch C3, the first brake B1, and the second brake B2 are disengaged. A fourth forward gear is formed when the second clutch C2, the third clutch C3, and the third brake B3 are engaged to transmit torque, while the first clutch C1, the first brake B1, and the second brake B2 are disengaged.

Further, a fifth forward gear is formed when the first clutch C1, the second clutch C2, and the third clutch C3 are engaged to transmit torque, while the first brake B1, the second brake B2, and the third brake B3 are disengaged. A sixth forward gear is formed when the second clutch C2, the third clutch C3, and the first brake B1 are engaged to transmit torque, while the first clutch C1, the second brake B2, and the third brake B3 are disengaged. A seventh forward gear is formed when the second clutch C2, the third clutch C3, and the second brake B2 are engaged to transmit torque, while the first clutch C1, the first brake B1, and the third brake B3 are disengaged. An eighth forward gear is formed when the third clutch C3, the first brake B1, and the second brake B2 are engaged to transmit torque, while the first clutch C1, the second clutch C2, and the third brake B3 are disengaged. An ninth forward gear is formed when the first clutch C1, the third clutch C3, and the second brake B2 are engaged to transmit torque, while the second clutch C2, the first brake B1, and the third brake B3 are disengaged. Additionally, a reverse gear of the automatic transmission 10 is formed when the first clutch C1, the second brake B2, and the third brake B3 are engaged to transmit torque, while the second clutch C2, the third clutch C3, and the first brake B1 are disengaged.

The gear ratios shown in FIG. 4 are determined from stationary transmission ratios of the four planetary gear sets P1 to P4. According to the shift pattern in FIG. 4, double shifts or range shifts can be avoided with sequential shifting because two adjacent gears share two shift control elements that are engaged. For example, when up-shifting from the first gear to the second gear, it is only necessary that the first brake B1 is engaged while disengaging the second brake B2 keeping the second clutch C2 and the third brake B3 engaged. For another example, when down-shifting from the ninth gear to the eighth gear, it is only necessary that the first brake B1 is engaged while disengaging the first clutch C1 keeping the third clutch C3 and the second brake B2 engaged.

In the automatic transmission 10 according to an exemplary aspect of the present disclosure, the first forward gear has a highest forward gear ratio of the automatic transmission, while the ninth forward gear has a lowest forward gear ratio of the automatic transmission. In particular, it is desirable that a ratio spread between the highest forward gear ratio and the lowest forward gear ratio is less than 10.5 and greater than 7.5. In an illustrative example shown in FIG. 4, the ratio spread between the highest forward gear ratio and the lowest forward gear ratio is 8.977. It is also favorable that a ratio step between any two immediately adjacent forward gear ratios of the automatic transmission 10 is less than 2.00 and greater than 1.10. As a result, the automatic transmission 10 maintains a prime mover, such as an engine, in an efficient operating condition and improves vehicle fuel efficiency. The close gear ratio steps also enable a more responsive torque demand logic and enhance vehicle drivability. Advantageously, the shift control elements in the automatic transmission 10 have low torque requirements so that these elements are themselves reduced in size and experience lower friction.

Figure 7:
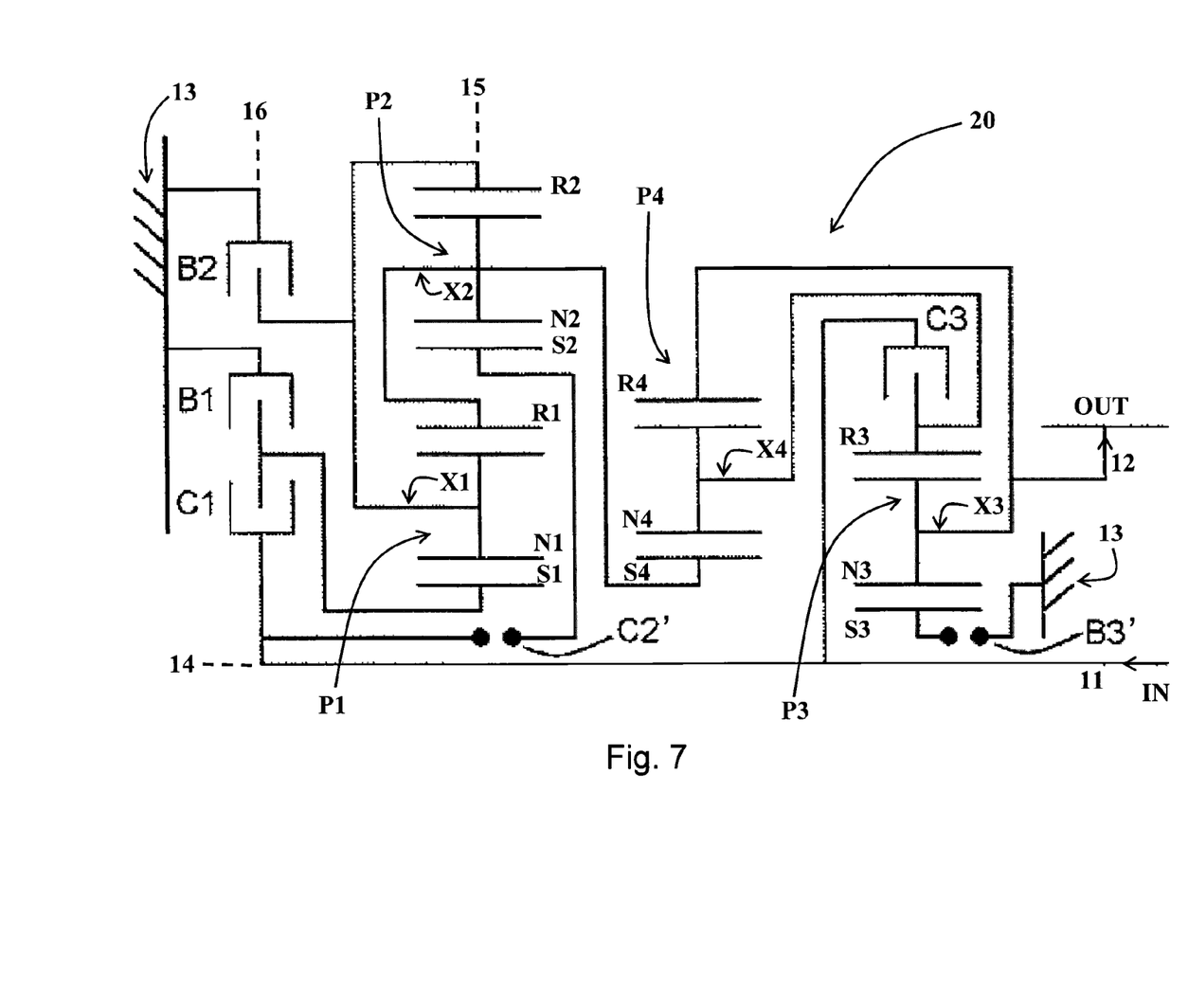
FIG. 7 is a schematic view of an illustrative automatic transmission according to a further aspect of the disclosure.

In FIG. 7, an illustrative automatic transmission 20 is shown in accordance with a further aspect of the present disclosure. The automatic transmission 20 of FIG. 7 includes all the features of the automatic transmission 10 of FIG. 1, with the second clutch C2' implemented as a locking clutch and/or the third brake B3' implemented as a locking clutch. In this variation, the locking clutch may be a dog clutch instead of a higher friction multi-plate wet clutch. Each dog clutch is a low-friction element that further reduces friction loss within the automatic transmission 20 while also maintaining shift performance. In addition, this variation further improves fuel economy in the eighth and ninth gears because only one wet plate friction clutch is open in the eighth and ninth gears.

The foregoing disclosure describes merely illustrative embodiments of the present invention. As will be understood by those skilled in the art, the present invention may be embodied in other specific forms without departing from the spirit or essential characteristics thereof. Accordingly, the disclosure is intended to be illustrative of the present invention, but not limiting of the scope of the invention, as well as the following claims. The disclosure and any discernible variants of the teachings herein define, at least in part, the scope of the claim terminology, such that no inventive subject matter is dedicated to the public.

The invention claimed is:

1. A multi-speed automatic transmission, comprising:
an input shaft;
a first planetary gear set including a first sun gear, a first pinion gear set, a first carrier that rotatably supports the first pinion gear set, and a first ring gear, in which the first sun gear meshes with the first pinion gear set, and the first pinion gear set meshes with the first sun gear and the first ring gear;
a second planetary gear set including a second sun gear, a second pinion gear set, a second carrier that rotatably supports the second pinion gear set, and a second ring gear, in which the second sun gear meshes with the second pinion gear set, and the second pinion gear set meshes with the second sun gear and the second ring gear;
a third planetary gear set including a third sun gear, a third pinion gear set, a third carrier that rotatably supports the third pinion gear set, and a third ring gear, in which the third sun gear meshes with the third pinion gear set, and the third pinion gear set meshes with the third sun gear and the third ring gear; and
a fourth planetary gear set including a fourth sun gear, a fourth pinion gear set, a fourth carrier that rotatably supports the fourth pinion gear set, and a fourth ring gear, in which the fourth sun gear meshes with the fourth pinion gear set, and the fourth pinion gear set meshes with the fourth sun gear and the fourth ring gear, wherein the first carrier is connected to the second ring gear, the second carrier is connected to the first ring gear, and the first and second planetary gear sets are concentrically arranged in a common plane, the third carrier is connected to the fourth ring gear, the fourth carrier is connected to the third ring gear, and the fourth sun gear is connected to the second carrier, and each of the first sun gear, the second sun gear, and the third ring gear are independently and releasably connected to the input shaft.

2. The multi-speed automatic transmission of claim 1, wherein an output shaft is directly connected to the third carrier.

3. The multi-speed automatic transmission of claim 1, wherein the first and second planetary gear sets are radially stacked with the second planetary gear set being radially outward of the first planetary gear set.

4. The multi-speed automatic transmission of claim 3, wherein the fourth planetary gear set is axially positioned between the third planetary gear set and a group of gears radially stacked between the first and second planetary gear sets.

5. The multi-speed automatic transmission of claim 1, further comprising:

a first shift control element that rotatably connects the first sun gear to the input shaft of the automatic transmission when the first shift control element is engaged;

a second shift control element that rotatably connects the second sun gear to the input shaft when the second shift control element is engaged;

a third shift control element that rotatably connects the third ring gear to the input shaft when the third shift control element is engaged;

a fourth shift control element that fixedly connects the first sun gear to a transmission case of the automatic transmission when the fourth shift control element is engaged;

a fifth shift control element that fixedly connects the first carrier to the transmission case when the fifth shift control element is engaged; and a sixth shift control element that fixedly connects the third sun gear to the transmission case when the sixth shift control element is engaged.

6. The multi-speed automatic transmission of claim 5, wherein at least one of the second shift control element and the sixth shift control element is a dog clutch.

7. The multi-speed automatic transmission of claim 5, wherein at least three of the first, second, third, fourth, fifth, and sixth shift control elements are engaged to provide any one of the nine forward gear ratios and the one reverse gear ratio.

8. The multi-speed automatic transmission of claim 5, wherein the first, the fourth, and the fifth shift control elements are concentrically arranged in a single plane.

9. The multi-speed automatic transmission of claim 5, wherein the first, the fourth, and the fifth shift control elements are packaged outside of a gear train formed by the first, the second, the third, and the fourth planetary gear sets.

10. The multi-speed automatic transmission of claim 5, wherein the second, the fifth, and the sixth shift control elements are engaged in a first forward gear ratio, the second, the fourth, and the sixth shift control elements are engaged in a second forward gear ratio, the first, the second, and the sixth shift control elements are engaged in a third forward gear ratio, the second, the third, and the sixth shift control elements are engaged in a fourth forward gear ratio, the first, the second, and the third shift control elements are engaged in a fifth forward gear ratio, the second, the third, and the fourth shift control elements are engaged in a sixth forward gear ratio, the second, the third, and the fifth shift control elements are engaged in a seventh forward gear ratio, the third, the fourth, and the fifth shift control elements are engaged in an eighth forward gear ratio, the first, the third, and the fifth shift control elements are engaged in a ninth forward gear ratio, and the first, the fifth, and the sixth shift control elements are engaged in a reverse gear ratio.

11. The multi-speed automatic transmission of claim 10, wherein the first forward gear ratio is a highest forward gear ratio of the automatic transmission, and the ninth forward gear ratio is a lowest forward gear ratio of the automatic transmission.

12. The multi-speed automatic transmission of claim 11, wherein a ratio spread between the highest forward gear ratio and the lowest forward gear ratio is less than 10.5 and greater than 7.5, and a ratio step between any two immediately adjacent forward gear ratios is less than 2.0 and greater than 1.1.

* * * * *